(12) United States Patent
Baptist et al.

(10) Patent No.: US 9,274,864 B2
(45) Date of Patent: Mar. 1, 2016

(54) ACCESSING LARGE AMOUNTS OF DATA IN A DISPERSED STORAGE NETWORK

(75) Inventors: Andrew Baptist, Chicago, IL (US); Ilya Volvovski, Chicago, IL (US); Greg Dhuse, Chicago, IL (US); Wesley Leggette, Chicago, IL (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/588,391

(22) Filed: Aug. 17, 2012

(65) Prior Publication Data
US 2013/0086448 A1 Apr. 4, 2013

Related U.S. Application Data

(60) Provisional application No. 61/542,923, filed on Oct. 4, 2011.

(51) Int. Cl.
*H03M 13/05* (2006.01)
*G06F 11/00* (2006.01)
(Continued)

(52) U.S. Cl.
CPC ........ *G06F 11/00* (2013.01); *G06F 3/06* (2013.01); *G06F 11/1076* (2013.01); *H04L 9/085* (2013.01); *H04L 9/0863* (2013.01); *H04L 9/0869* (2013.01); *H04L 9/321* (2013.01); *H04L 9/3263* (2013.01); *H04L 63/0823* (2013.01);
(Continued)

(58) Field of Classification Search
CPC ............ G06F 11/1076; G06F 11/1008; G06F 11/1068; G06F 11/1044; G06F 15/173; G06F 11/00; G06F 21/33; G06F 3/06; G06F 3/0604; G06F 15/17331; G06F 3/067; G06F 11/1446; G06F 2211/1028; H04L 63/0823; H04L 9/0863; H04L 9/3263; H04L 9/0869; H04L 2209/04; H04L 9/085; H04L 2209/34; H04L 9/321
USPC ................... 714/763, E11.034; 709/238, 226
See application file for complete search history.

(56) References Cited

U.S. PATENT DOCUMENTS 4,092,732 A  5/1978  Ouchi
5,454,101 A  9/1995  Mackay et al.
(Continued)

OTHER PUBLICATIONS

Walraed-Sullivan, Meg., et al., "ALIAS: Scalable, Decentralized Label Assignment for Data Centers," SOCC'11, Oct. 27-28, 2011, Cascais, Portugal.*

(Continued)

*Primary Examiner* — Albert Decady
*Assistant Examiner* — Kyle Vallecillo
(74) *Attorney, Agent, or Firm* — Garlick & Markison; Timothy W. Markison

(57) ABSTRACT

A method begins by a dispersed storage (DS) processing module obtaining a plurality of data objects for storage in a dispersed storage network (DSN) and determining one or more common data object aspects of a data object of the plurality of data objects. The method continues with the DS processing module disperse storage error encoding at least a portion of the data object to produce a set of encoded data slices and generating a set of DSN addresses for the set of encoded data slices, wherein each of the set of DSN addresses includes a field referencing the one or more common data object aspects. The method continues with the DS processing module outputting the set of encoded data slices for storage in the DSN based on the set of DSN addresses.

18 Claims, 10 Drawing Sheets

(51) Int. Cl.
*H04L 9/32* (2006.01)
*H04L 29/06* (2006.01)
*H04L 9/08* (2006.01)
*G06F 3/06* (2006.01)
*G06F 11/10* (2006.01)
*G06F 21/33* (2013.01)
*G06F 11/14* (2006.01)
*G06F 15/173* (2006.01)

(52) U.S. Cl.
CPC ............ *G06F 3/0604* (2013.01); *G06F 3/067* (2013.01); *G06F 11/1446* (2013.01); *G06F 15/17331* (2013.01); *G06F 21/33* (2013.01); *G06F 2211/1028* (2013.01); *H04L 2209/04* (2013.01); *H04L 2209/34* (2013.01)

(56) References Cited

U.S. PATENT DOCUMENTS

| | | | |
|---|---|---|---|
| 5,463,765 A * | 10/1995 | Kakuta et al. | 714/6.12 |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0168634 A1 * | 7/2007 | Morishita et al. | 711/170 |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0040505 A1 * | 2/2008 | Britto et al. | 709/238 |
| 2008/0065827 A1 * | 3/2008 | Byrne et al. | 711/114 |
| 2008/0183975 A1 * | 7/2008 | Foster et al. | 711/153 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

(56) References Cited

OTHER PUBLICATIONS

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner computing system 10

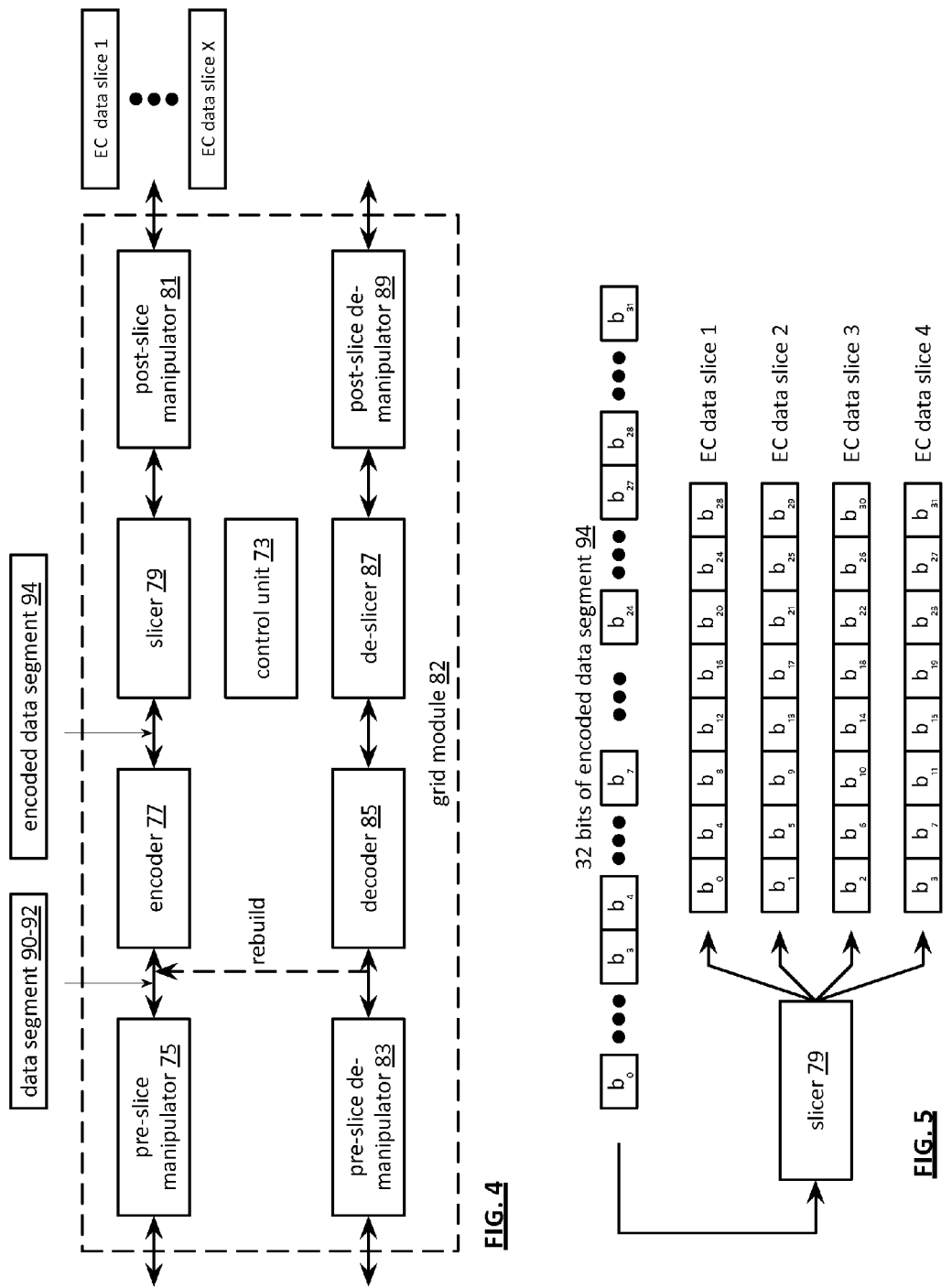

slice name 120

| slice index 122 | vault source name 124 | | | |
|---|---|---|---|---|
| | source name 126 | | object number 134 | segment number 128 |
| | vault ID 130 | gen 132 | | |

FIG. 6B

| source name 126 or object number 134 | data object aspect field 136 | data object ID 138 |
|---|---|---|
| | A | 1 |
| | A | 2 |
| | B | 1 |
| | A | 3 |
| | B | 2 |
| 2012 July 16 7:00-8:00 | | 1 |
| 2012 July 16 7:00-8:00 | | 2 |
| 2012 July 16 8:00-9:00 | | 1 |
| 2012 July 16 8:00-9:00 | | 2 |
| 2012 July 16 8:00-9:00 | | hash of data ID 457 |
| ••• | | |

FIG. 6C

ACCESSING LARGE AMOUNTS OF DATA IN A DISPERSED STORAGE NETWORK

CROSS REFERENCE TO RELATED PATENTS

The present U.S. Utility Patent Application claims priority pursuant to 35 U.S.C. §119(e) to U.S. Provisional Application No. 61/542,923, entitled "Storing Passwords in a Dispersed Credential Storage System" filed Oct. 4, 2011, which is incorporated herein by reference in its entirety and made part of the present U.S. Utility Patent Application for all purposes.

STATEMENT REGARDING FEDERALLY SPONSORED RESEARCH OR DEVELOPMENT

This invention was made with Government support under Contract No. 2009*0674524*000 awarded by the Central Intelligence Agency. The Government has certain rights in the invention.

INCORPORATION-BY-REFERENCE OF MATERIAL SUBMITTED ON A COMPACT DISC

Not applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the Internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller. Data is stored in a memory device in accordance with the data storage format such that any subsequent updates to the data require overwriting the stored data in the memory device. The rewriting of updated data may be costly in terms of utilization of the interfacing between the computer's processing function and the storage system.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the present invention;

FIG. 5 is a diagram of an example embodiment of error coded data slice creation in accordance with the present invention;

FIG. 6B is a diagram illustrating an example of a source name structure in accordance with the present invention;

FIG. 6C is a diagram illustrating an example of an object number structure in accordance with the present invention;

DETAILED DESCRIPTION OF THE INVENTION

Figure 1:
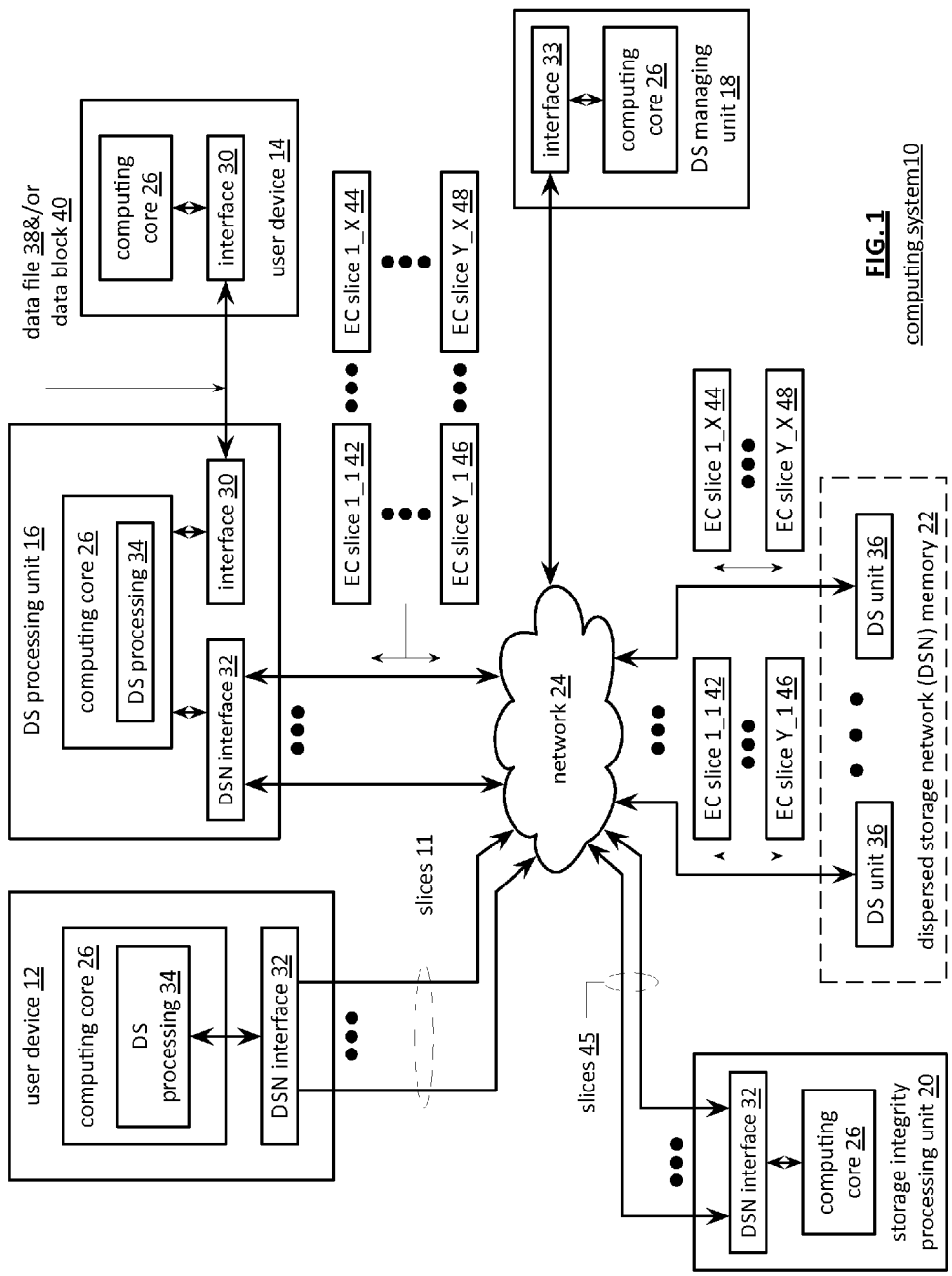
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
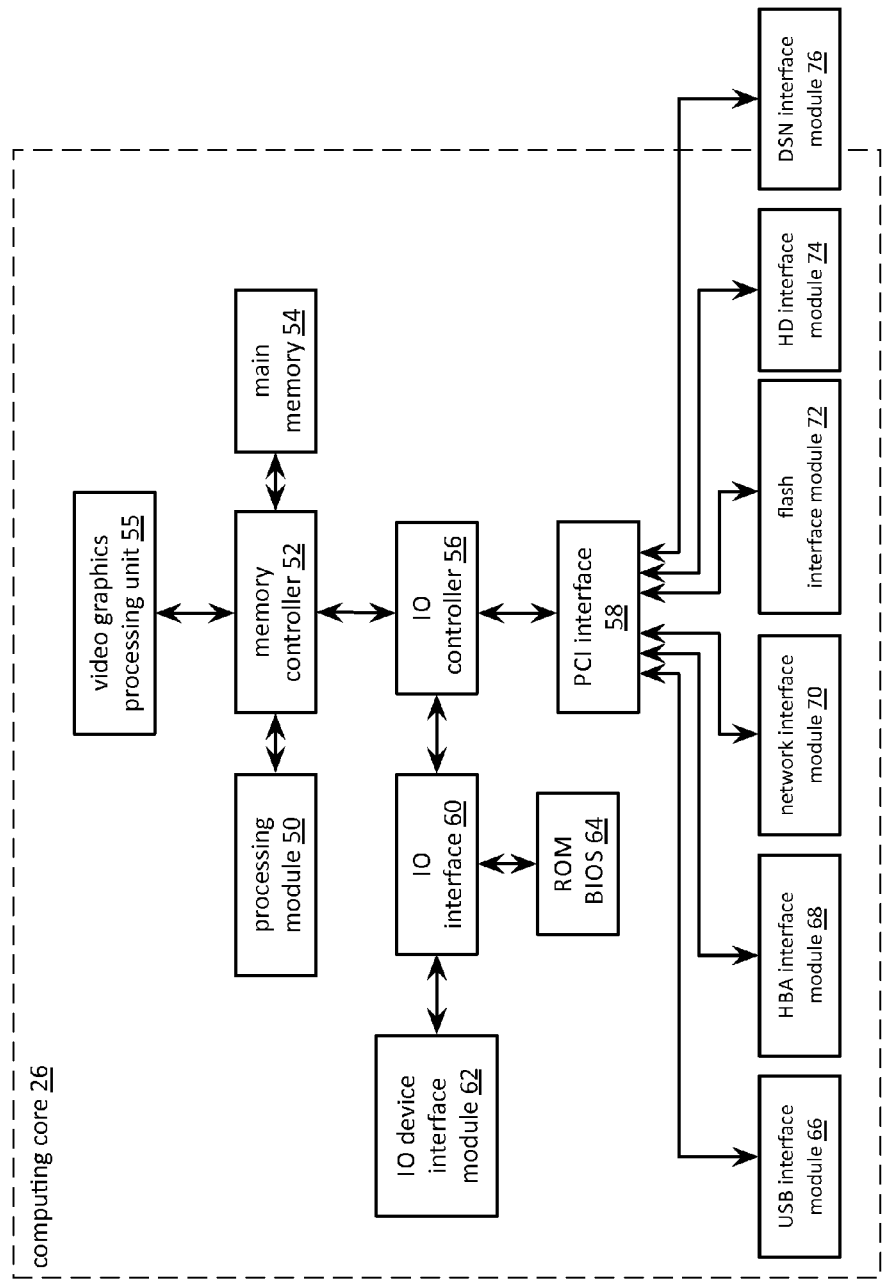
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
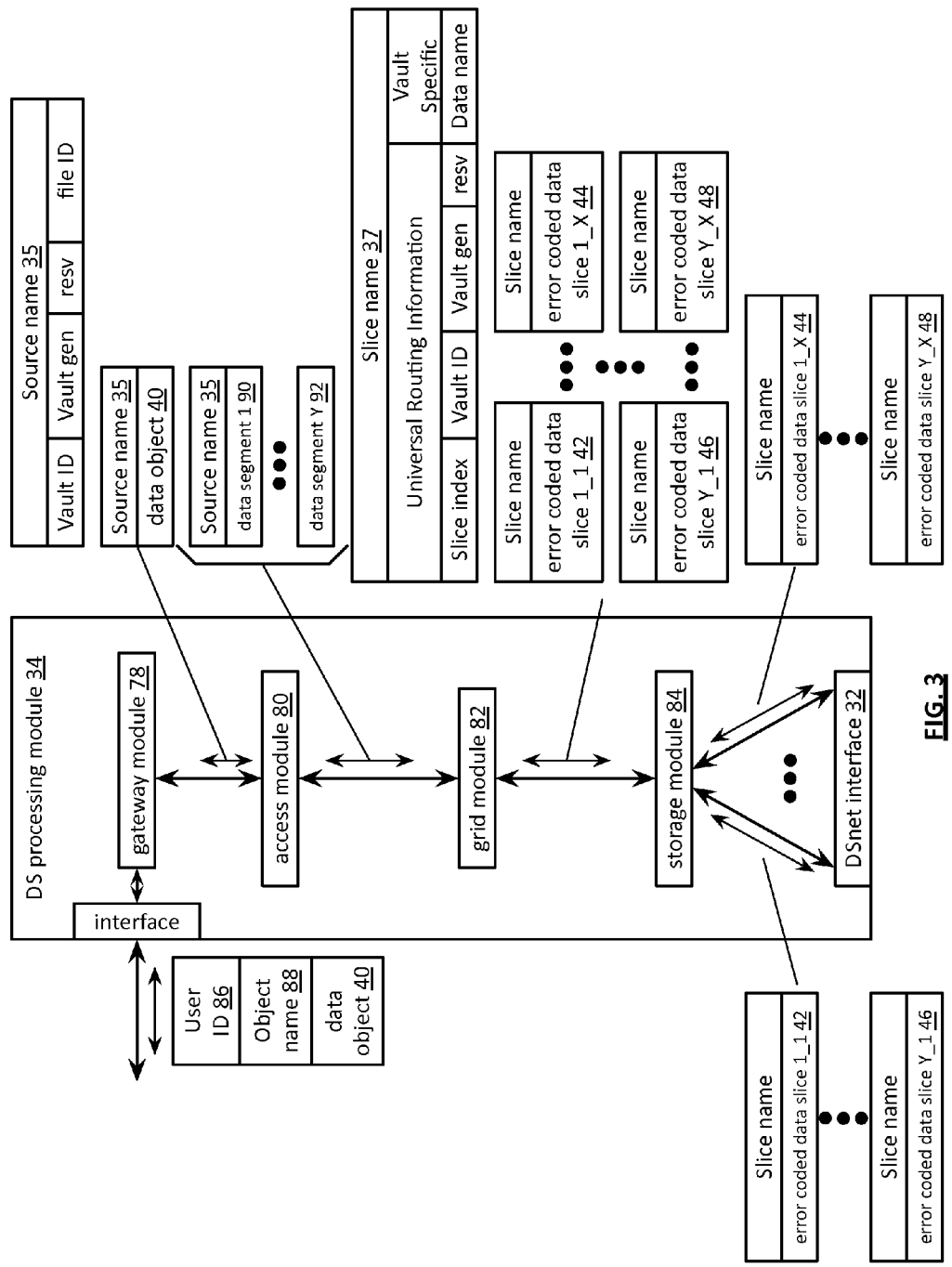
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-48.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 90-92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 90-92, the same encoding algorithm for the data segments 90-92 of a data object, or a combination thereof.

The encoded data segment 94 is of greater size than the data segment 90-92 by the overhead rate of the encoding algorithm by a factor of X/T, where X is the width or number of slices, and T is the read threshold. In this regard, the corresponding decoding process can accommodate at most X-T missing EC data slices and still recreate the data segment 90-92. For example, if X=16 and T=10, then the data segment 90-92 will be recoverable as long as 10 or more EC data slices per segment are not corrupted.

The slicer 79 transforms the encoded data segment 94 into EC data slices in accordance with the slicing parameter from the vault for this user and/or data segment 90-92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, bytes, data words, etc., but may include more or less bits, bytes, data words, etc. The slicer 79 disperses the bits of the encoded data segment 94 across the EC data slices in a pattern as shown. As such, each EC data slice does not include consecutive bits, bytes, data words, etc. of the data segment 94 reducing the impact of consecutive bit, byte, data word, etc. failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6A:
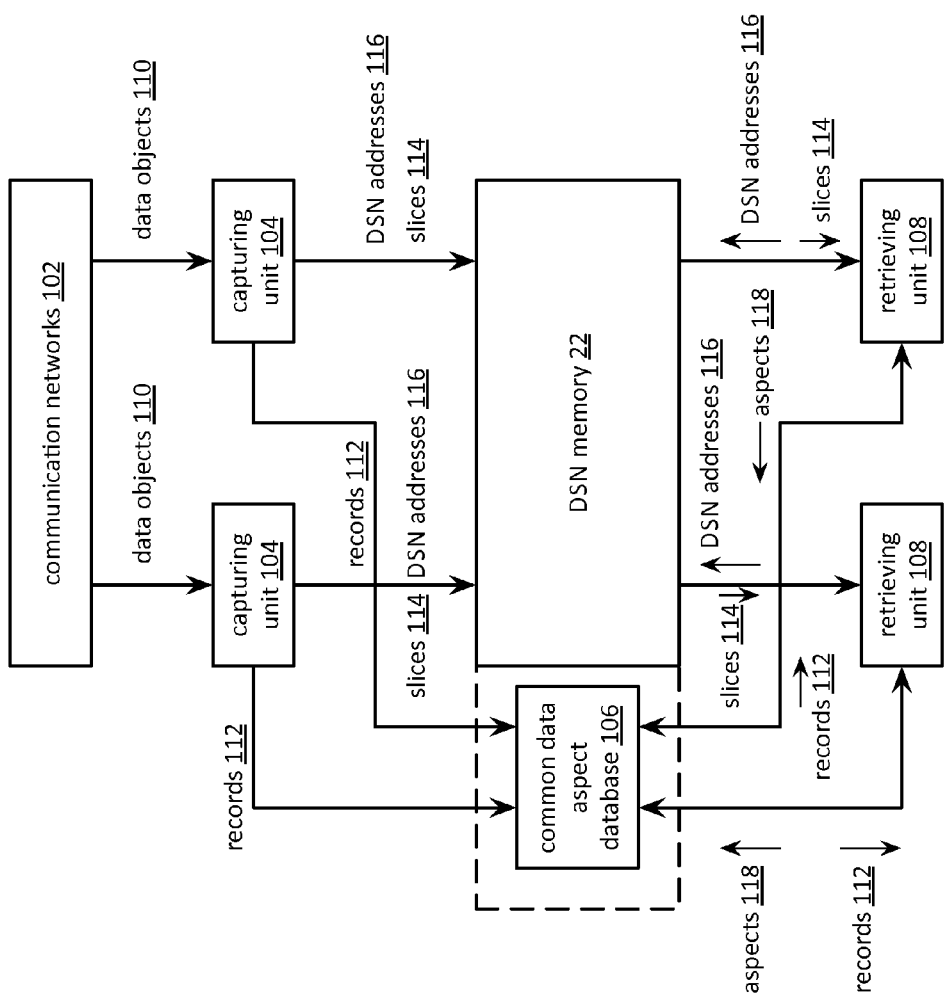
FIG. 6A is a schematic block diagram of another embodiment of a computing system in accordance with the present invention.

FIG. 6A is a schematic block diagram of another embodiment of a computing system that includes communication networks 102, a plurality of capturing units 104, a dispersed storage network (DSN) memory 22, a common data aspect database 106, and a plurality of retrieving units 108. The communication network 102 includes one or more of a wireless communication network, a wireline communication network (public switched telephone network), an Internet, a computing network, a data storage network, and a sensor network. A capturing unit 104 of the plurality of capturing units 104 may be implemented utilizing at least one of a dispersed storage (DS) processing unit, a user device, a DS unit, and a data ingestion processing module. The DSN memory 22 includes a plurality of DS units and may include the common data aspect database 106. The common data aspect database 106 may be implemented utilizing at least one of a database application, a database server, and one or more DS units of the plurality of DS units.

The system is operable to capture millions of data objects 110 from the communication networks 102, encode the data objects 110 to produce slices 114, store the slices 114 in the DSN memory 22 in accordance with aspects 188, storing records 112 of the storing in the common data aspect database 106, retrieve the slices 114 from the DSN memory 22 in accordance with the aspects 188, and decode the slices 114 to recover one or more data objects 110. The storing and retrieving of the slices 114 includes generating DSN addresses 116 based on the aspects 118 and utilizing the DSN addresses 116 to access the DSN memory 22. The DSN addresses 116 include at least one of a slice name, a vault source name, and a source name. Structure of the DSN addresses is discussed in greater detail with reference to FIGS. 6B-C. Methods and apparatus to utilize the aspects 118 to generate the DSN addresses 116 is discussed in greater detail with reference to FIGS. 6E-6G.

FIG. 6B is a diagram illustrating an example of a slice name structure 120 that includes a slice index field 122 and a vault source name field 124. The slice index field 122 includes one or more slice index entries corresponding to a pillar number. The vault source name field 124 includes a source name field 126 and a segment number field 128. The segment number field 128 includes at least one segment number entry corresponding to a segment number of a data object being stored. The source name field 126 includes a vault identifier (ID) field 130, a vault generation field 132, and an object number field 134. A segment number entry identifies a segment corresponding to a common source name entry. For example, sequential segment number entries 1-10 corresponds to a given source name entry for storage of a data object that requires 10 segments. The vault ID field 130 includes one or more vault ID entries corresponding to the data object being stored. The vault generation field 132 includes one or more vault generation entries corresponding to a generation of each vault being stored. The object number field 134 includes one or more object number entries, wherein an object number entry is associated with a data object being stored.

An object number entry may be generated as at least one of the random number, a sequential number, a predetermined number, and an aspect driven number. For example, an object number entry for a first data object includes two aspects including a first aspect that is shared in common with a second data object and a second aspect that is unique to the first data object. An object number entry for the second data object includes the first aspect that is shared in common with the first data object and a second aspect that is unique to the second data object. Alternatively, a source name entry may be generated as an aspect driven number. A structure for entries of the source name field 126 and the object number field 134 is discussed in greater detail with reference to FIG. 6C.

FIG. 6C is a diagram illustrating an example of a structure of a source name field 126 or an object number field 134 that includes at least to the aspect driven fields including a data object aspect field 136 and a data object identifier (ID) field 138. Alternatively, the structure of the source name field 126 or object number field 134 may include more than two aspect driven fields. The overall structure includes a plurality of entries. Each entry of the plurality of entries includes a data object aspect value for the data object aspect field 136 and a corresponding data object ID value of the data object ID field 138. Each data object aspect value includes at least one of a time window aspect, a destination identifier (ID) of the data object, a source ID of the data object, one or more internet protocol (IP) addresses associated with the data object, a geographic location regarding the data object, data content information of the data object (e.g., names, key words and/or phrases, etc.), data size of the data object, a data object type (e.g., video, text, bank transaction, etc.), a capturing unit ID that obtained the data object, a collection identifier (ID), a random number, and a vault ID (includes generation and/or group affiliation). For example, a series of different data objects written to a dispersed storage network (DSN) memory within a common time period of Jul. 16, 2012 from 7:00 AM to 8:00 AM share a common data object aspect field entry.

The data object ID field 138 includes one or more corresponding data object ID entries. A data object ID entry includes a unique value per data object utilizing a common data object aspect field entry. Each data object ID may be based on one or more of a random number, a previous data object ID incremented by 1 or more, a previous data object ID decremented by 1 or more, and a result of a deterministic function (e.g., a hashing function) performed on a data name of the data object. Each data object of a plurality of data objects may be assigned a different data object ID when the plurality of data objects share a common aspect is represented by a common data object aspect field entry. For example, a first data object is assigned a data object ID field entry of 1 and a second data object is assigned a data object ID field entry of 2 when the first and second data objects share in the common data object aspect field entry of Jul. 16, 2012 from 8:00 AM to 9:00 AM. The source name field 126 or object number 134 may be utilized by a dispersed storage (DS) unit to select a memory device of a plurality of memory devices associated with the DS unit for storage of an associated encoded data slice. For example, the data object aspect field entry is utilized to select a memory device and the data object ID field entry is utilized to select an offset within the memory device. The method and apparatus of generation of the source name field entry or object number field entry is discussed in greater detail with reference to FIGS. 6D-6G.

Figure 6D:
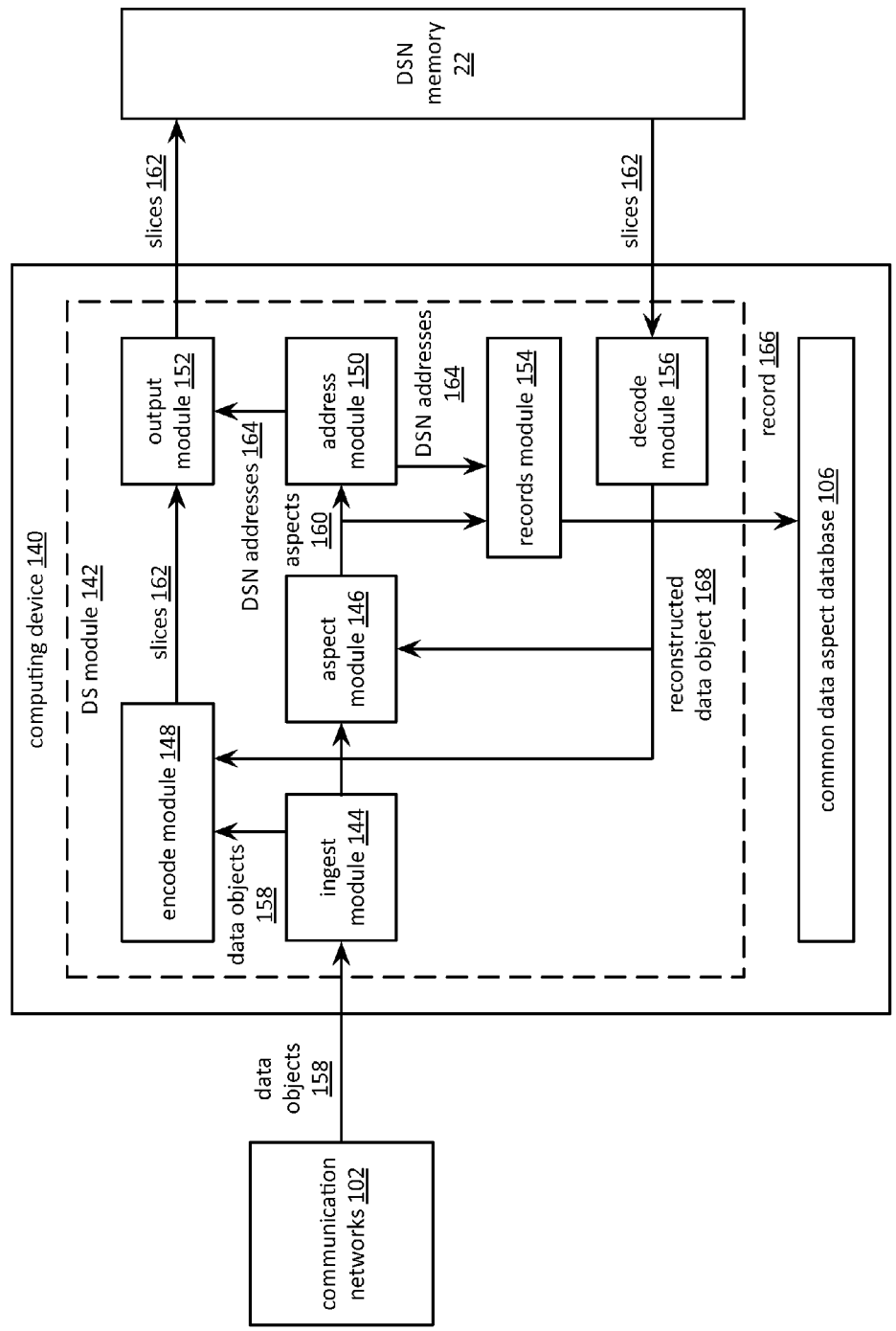
FIG. 6D is a schematic block diagram of another embodiment of a computing system in accordance with the present invention.

FIG. 6D is a schematic block diagram of another embodiment of a computing system that includes a computing device 140, communication networks 102, and a dispersed storage network (DSN) memory 22. The computing device 140 may be implemented as one or more of a capturing unit, user device, a dispersed storage processing (DS) unit, a DS unit, a DS managing unit, and a storage integrity processing unit. The computing device 140 includes a DS module 142 and may include a common data aspect database 106. Alternatively, the common data aspect database 106 is implemented within the DSN memory 22. The DS module 142 includes an ingest module 144, an aspect module 146, an encode module 148, an address module 150, an output module 152, a records module 154, and a decode module 156. The system is operable to ingest a plurality of data objects 158 from the communication networks 102 and facilitate storage of the plurality of data objects 158 in the DSN memory 22. The facilitating storage includes determining one or more common data object aspects 160 of each data object 158, encoding a data object to produce a set of encoded data slices 162, generating a set of DSN addresses 164 referencing the one or more common data object aspects 160, outputting the set of encoded data slices 162 for storage in the DSN memory 22, and creating a record 166 for the data object 158 in the common data object aspect database 106.

The ingest module 144 obtains a plurality of data objects for storage in the DSN memory 22. The obtaining includes receiving, for each data object of the plurality of data objects, one or more of the data object, a data name associated with the data object, a data object identifier (ID) associated with the data object, and a common data object aspect. The aspect module 146 determines one or more common data object aspects 160 of a data object of the plurality of data objects 158. A common data object aspect of the one or more common data object aspects 160 is an aspect shared by two or more of the plurality of data objects 158. The common data object aspect is one of a plurality of common data object aspects that includes two or more of: a time window aspect, a destination identifier (ID) of the data object, a source ID of the data object, one or more internet protocol (IP) addresses associated with the data object, a geographic location regarding the data object, data content information of the data object (e.g., names, key words and/or phrases, etc.), data size of the data object, a data object type (e.g., video, text, bank transaction, etc.), a capturing unit ID that obtained the data object, and a vault ID (e.g., includes generation and/or group affiliation). The determining of the one or more common data object aspects 160 may be based on one or more of receiving at least one common data object aspect with a corresponding data object, a query to a communication network of the communication networks 102, an analysis, and a lookup based on the data name.

The encode module 148 disperse storage error encodes at least a portion of the data object to produce a set of encoded data slices 162. A portion may include one or more data segments. The address module 150 generates a set of DSN addresses 164 for the set of encoded data slices 162. Each of the set of DSN addresses includes a field referencing the one or more common data object aspects 160. The address module 150 generates a DSN address of the set of DSN addresses by generating a slice index field, generating a data object aspect field, generating a data object ID, and generating a segment field regarding the at least a portion of the data object. The output module 152 outputs the set of encoded data slices 162 for storage in the DSN memory 22 based on the set of DSN addresses 164. For example, the output module 152 generates a set of write slice requests that includes a set of slice names of the set of DSN addresses 164 and the set of encoded data slices 162. Next the output module 152 sends the set of write slice requests to the DSN memory 22.

The records module 154 creates a record 166 for the data object in the common data object aspect database 106. The record 166 may include one or more of a data object identifier, information regarding the one or more common data object aspects (e.g., how many, which aspects), and a portions number indicating a number of portions constituting the data object. The common data object aspect database includes a plurality of records for at least some of the plurality of data objects 158.

The system is further operable to store a plurality of portions of each data object of the plurality of data objects 158. When storing the plurality of portions of each data object, the encode module 148 divides the data object into a plurality of portions and disperse storage error encode the plurality of portions to produce a plurality of sets of encoded data slices 162. The address module 150 generates a plurality of sets of DSN addresses 164 for the plurality of sets of encoded data slices 162. Each DSN address of the plurality of sets of DSN addresses 164 includes a field referencing the one or more common data object aspects 160. The output module 152 outputs the plurality of sets of encoded data slices 162 for storage in the DSN memory 22 based on the plurality of sets of DSN addresses 164.

The system is further operable to refresh storage of the data object utilizing additional common data object aspects 160. The refreshing includes the decode module 156 decoding a decode threshold number of the set of encoded data slices 162 for each portion of the data object to produce a reconstructed data object 168. The aspect module 146 analyzes the reconstructed data object 168 to identify additional common data object aspects. The encode module 148 disperse storage error encode at least a portion of the reconstructed data object 168 to produce a new set of encoded data slices 162. The address module 150 generates a new set of DSN addresses 164 for the new set of encoded data slices 162. Each of the new set of DSN addresses 164 includes a field referencing the one or more common data object aspects 160 and the additional common data object aspects. The output module 152 outputs the new set of encoded data slices 162 for storage in the DSN memory 22 based on the new set of DSN addresses 164.

Figure 6E:
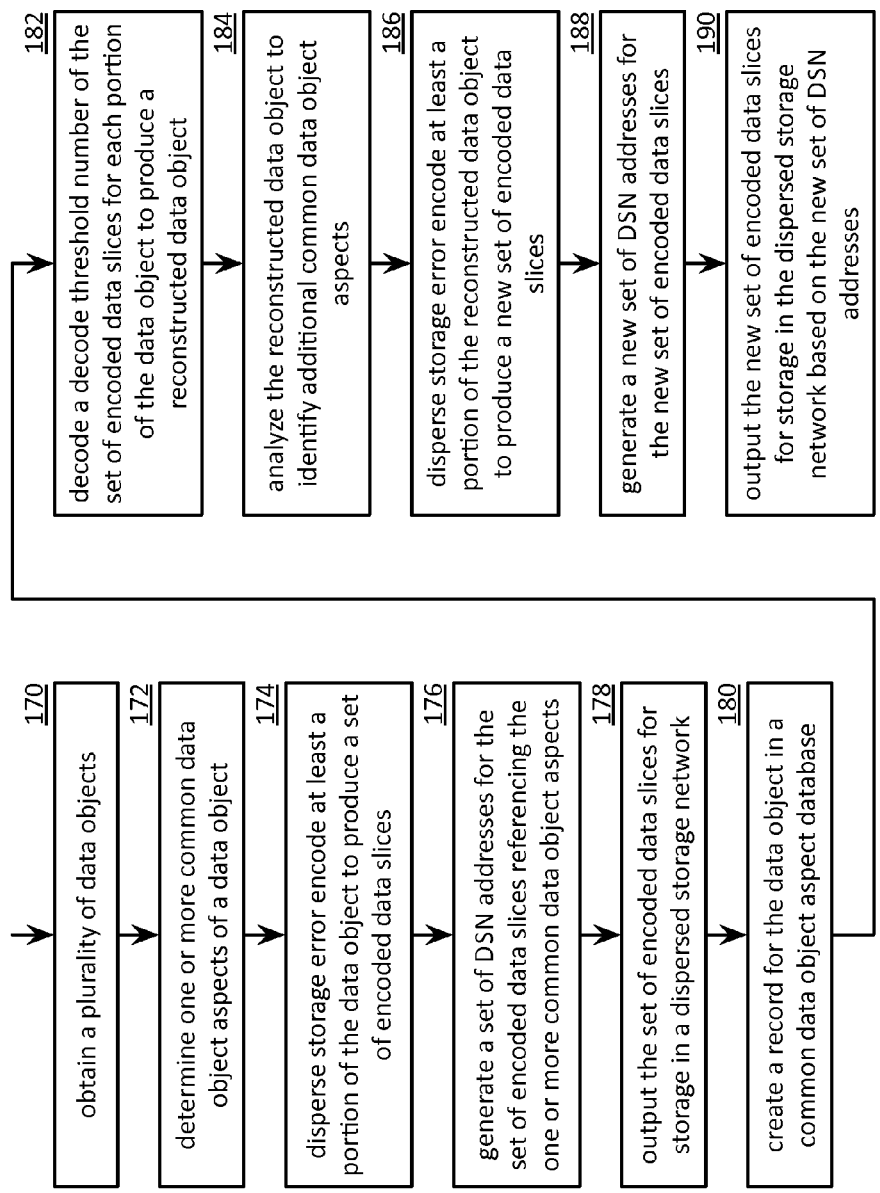
FIG. 6E is a flowchart illustrating an example of storing large amounts of data in accordance with the present invention.

FIG. 6E is a flowchart illustrating an example of storing large amounts of data. The method begins at step 170 where a processing module (e.g., of a capturing unit) obtains (e.g., receives, intercepts, captures, queries, retrieves, collects, etc.) a plurality of data objects for storage in a dispersed storage network (DSN). For example, processing module obtains millions of data objects in a given time period from millions of data object sources. The method continues at step 172 where the processing module determines one or more common data object aspects of a data object of the plurality of data objects. A common data object aspect of the one or more common data object aspects is an aspect shared by two or more of the plurality of data objects. The method continues at step 174 where the processing module disperse storage error encodes at least a portion of the data object (e.g., a data segment) to produce a set of encoded data slices.

The method continues at step 176 where the processing module generates a set of DSN addresses for the set of encoded data slices. Each of the set of DSN addresses includes a field referencing the one or more common data object aspects. The generating a DSN address of the set of DSN addresses includes generating a slice index field, generating a data object aspect field, generating a data object ID, and generating a segment field regarding the at least a portion of the data object. For example, the processing module generates the data object aspect field to include a common data object aspect of the data object and a previously stored associated data object. As another example, the processing module generates the data object ID to include a data object ID of the previously stored associated data object incremented by one when the data object is a next data object one sequentially storing a sequence of associated data objects.

The method continues at step 178 where the processing module outputs the set of encoded data slices for storage in the DSN based on the set of DSN addresses. Alternatively, or in addition to, the processing module may store more than the at least a portion of the data object. When the processing module stores more than the at least a portion of the data object, the processing module divides the data object into a plurality of portions and disperse storage error encoding the plurality of portions to produce a plurality of sets of encoded data slices. Next, the processing module generates a plurality of sets of DSN addresses for the plurality of sets of encoded data slices. Each DSN address of the plurality of sets of DSN addresses includes a field referencing the one or more common data object aspects. Next, the processing module outputs the plurality of sets of encoded data slices for storage in the DSN based on the plurality of sets of DSN addresses.

The method continues at step 180 where the processing module creates a record for the data object in a common data object aspect database. The record includes a data object identifier, information (e.g., an aspect identifier, aspect details, and aspect name, a cross reference to another data object) regarding the one or more common data object aspects, and a portions number indicating a number of portions constituting the data object. The common data object aspect database includes a plurality of records for at least some of the plurality of data objects.

The method continues at step 182 where the processing module decodes a decode threshold number of the set of encoded data slices for each portion of the data object to produce a reconstructed data object. The method continues at step 184 where the processing module analyzes the reconstructed data object to identify additional common data object aspects. The method continues at step 186 for the processing module disperse storage error encodes at least a portion of the reconstructed data object to produce a new set of encoded data slices. The method continues at step 188 where the processing module generates a new set of DSN addresses for the new set of encoded data slices. Each of the new set of DSN addresses includes a field referencing the one or more common data object aspects and the additional common data object aspects. The method continues at step 190 where the processing module outputs the new set of encoded data slices for storage in the DSN based on the new set of DSN addresses.

Figure 6F:
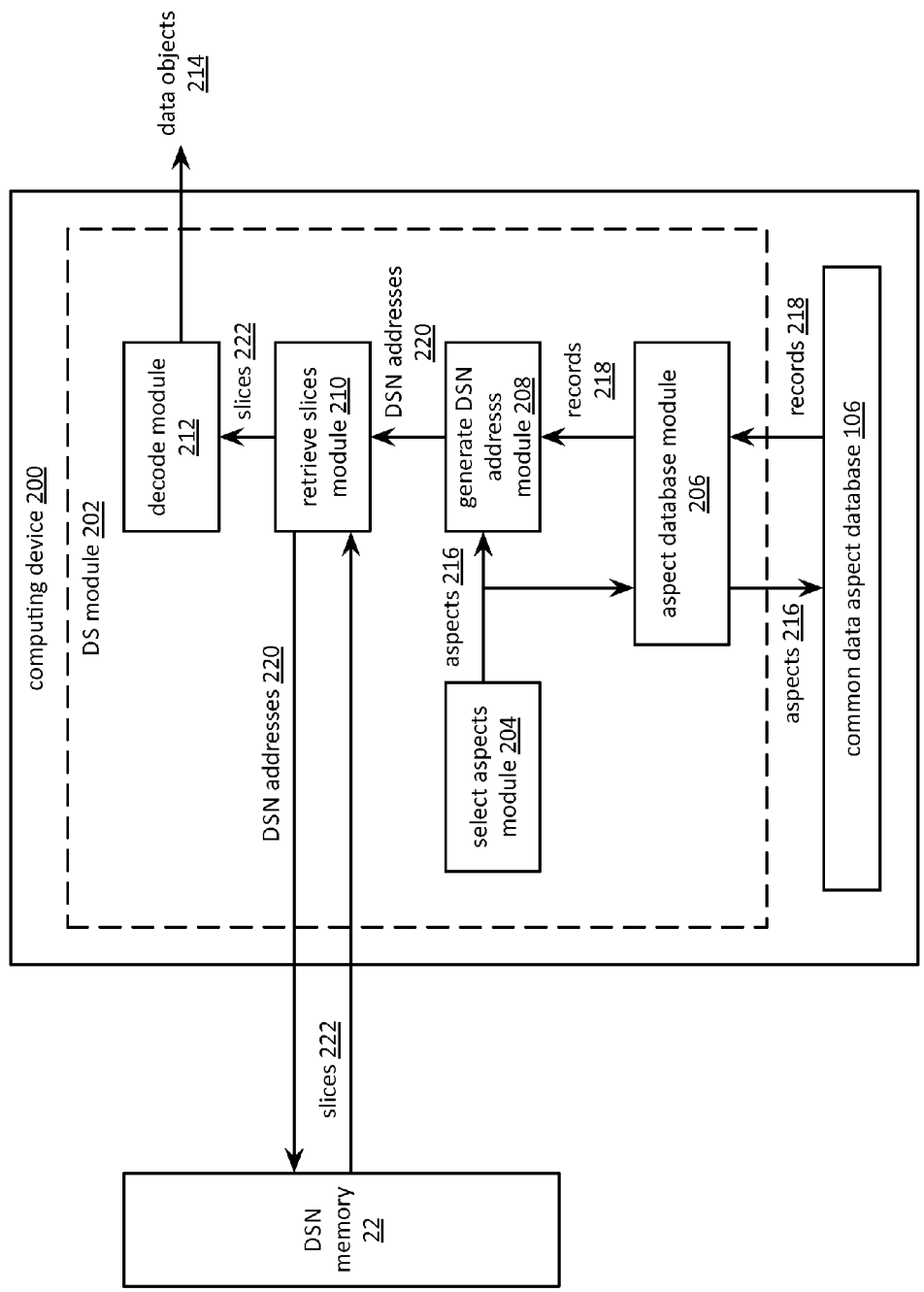
FIG. 6F is a schematic block diagram of another embodiment of a computing system in accordance with the present invention.

FIG. 6F is a schematic block diagram of another embodiment of a computing system that includes a computing device 200 and a dispersed storage network (DSN) memory 22. The computing device 200 may be implemented as one or more of a retrieving unit, a user device, a dispersed storage processing (DS) unit, a DS unit, a DS managing unit, and a storage integrity processing unit. The computing device 200 includes a DS module 202 and may include a common data aspect database 106. Alternatively, the common data aspect database 106 is implemented within the DSN memory 22. The DS module 202 includes a select aspects module 204, an aspect database module 206, a generate DSN address module 208, a retrieve slices module 210, and a decode module 212. The system is operable to facilitate retrieval of one or more data objects 214 from the DSN memory 22. When retrieving one data object 214 from the DSN memory 22, the facilitating retrieval includes selecting one or more common data object aspects 216, accessing the common data aspect database 106 based on the selected common data object aspects 216 to identify a set of records 218, generating a set of DSN addresses 220, retrieving at least a decode threshold number of encoded data slices 222 from the DSN based on the set of DSN addresses 220, and decoding the least a decode threshold number of encoded data slices 222 to reproduce at least a portion of a first data object 214.

The select aspects module 204 selects one or more common data object aspects from a plurality of common data object aspects to produce selected common data object aspects 216. The plurality of common data object aspects includes two or more of: a time window aspect, a destination identifier (ID) of the data object, a source ID of the data object, one or more internet protocol (IP) addresses associated with the data object, a geographic location regarding the data object, data content information of the data object (e.g., names, key words and/or phrases, etc.), data size of the data object, a data object type (e.g., video, text, bank transaction, etc.), a capturing unit ID that obtained the data object, and a vault ID (e.g., includes generation and/or group affiliation). The selecting includes at least one of receiving a user input, receiving a request, a lookup, receiving a search parameter, and utilizing a previously selected data object aspects.

The aspect database module 206 accesses the common data object aspect database 106 based on the selected common data object aspects 216 to identify the set of records 218. A record of the common data object aspect database 106 includes a data object identifier of a data object, information regarding one or more common data object aspects of the data object, and a portions number indicating a number of portions constituting the data object. For example, the aspect database module 206 searches the common data object aspect database 106 to identify a record associated with data object aspects that compare favorably (e.g., substantially aligned) to the selected common data object aspects 216 to produce the set of records 218.

The generate DSN address module 208 generates the set of DSN addresses 220 based on one or more of the data object identifier, the information regarding the one or more common data object aspects 216, and the portions number of a first record of the set of records 218. The generate DSN address module 208 generates a DSN address of the set of DSN addresses 220 by generating a slice index field based on the dispersed storage error encoding function, generating a data object aspect field based on the selected common data object aspects, generating a data object ID based on the data object identifier, and generating a segment field based on the portions number. The retrieve slices module 210 retrieves the at least a decode threshold number of encoded data slices 222 from the DSN memory 22 based on the set of DSN addresses 220. For example, the retrieve slices module 200 and generates at least a decode threshold number of read slice requests that includes the set of DSN addresses 220, sends the at least a decode threshold number of read slice requests to the DSN memory 22, and receives the least a decode threshold number of encoded data slices 222. The decode module 212 decodes the least a decode threshold number of encoded data slices 222 in accordance with a dispersed storage error encoding function to reproduce at least a portion of the first data object 214.

The system may retrieve more than the least a portion of the first data object. When the system retrieves more than the at least a portion of the first data object, the generate DSN address module 208 generates a plurality of sets of DSN addresses based on the data object identifier, the information regarding the one or more common data object aspects, and the portions number. For example, the generate DSN address module 208 generates the plurality of sets of DSN addresses to include a plurality of segment numbers in accordance with the portions number (e.g., all segment numbers). Next, the retrieve slices module 210 retrieves at least a decode threshold number of encoded data slices from the DSN memory 22 for each of the plurality of sets of DSN addresses. Next, the decode module 212 decodes the least a decode threshold number of encoded data slices from the DSN for each of the plurality of sets of DSN addresses in accordance with the dispersed storage error encoding function to reproduce a plurality of portions (e.g., all data segments) of the first data object. The decode module 212 reproduces the first data object from the plurality of portions of the first data object. For example, the decode module 212 aggregates the plurality of portions of the first data object to reproduce the first data object.

The system may retrieve more than one data object. When the system retrieves more than one data object, the generate DSN address module 208 generates a second set of DSN addresses based on the data object identifier, the information regarding the one or more common data object aspects, and the portions number of a second record of the set of records. For example, the generate DSN address module 208 increments the value of the data object identifier to produce a second data object identifier utilized in generating the second set of DSN addresses. Next, the retrieve slices module 210 retrieves at least a decode threshold number of second encoded data slices from the DSN memory 22 based on the second set of DSN addresses. The decode module 212 decodes the least a decode threshold number of second encoded data slices in accordance with the dispersed storage error encoding function to reproduce at least a portion of a second data object.

Figure 6G:
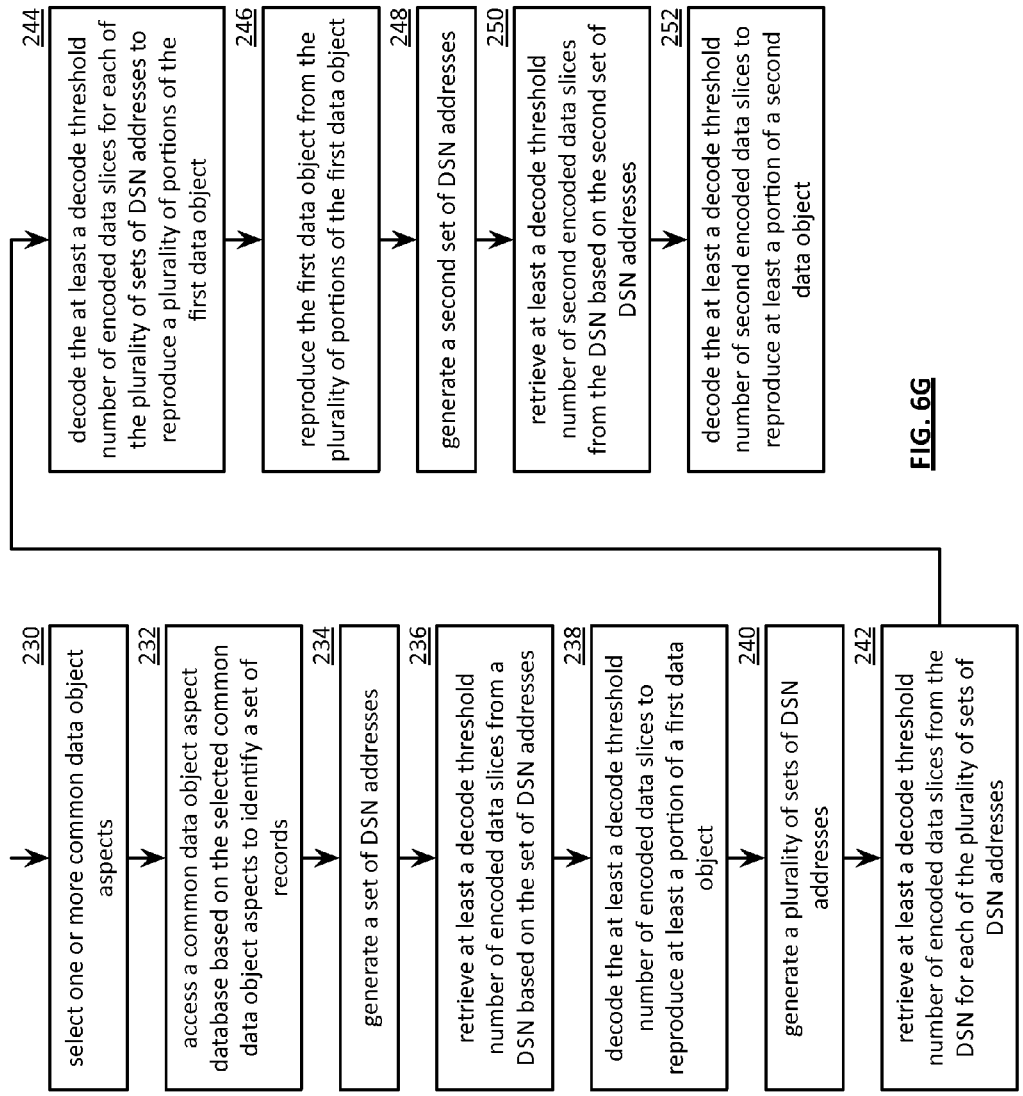
FIG. 6G is a flowchart illustrating an example of retrieving data objects having a common aspect in accordance with the present invention.

FIG. 6G is a flowchart illustrating an example of retrieving data objects having a common aspect. The method begins at step 230 where a processing module (e.g., of a retrieving unit) selects one or more common data object aspects from a plurality of common data object aspects to produce selected common data object aspects. The method continues at step 232 where the processing module accesses a common data object aspect database based on the selected common data object aspects to identify a set of records. A record of the common data object aspect database includes a data object identifier of a data object, information regarding one or more common data object aspects of the data object, and a portions number indicating a number of portions constituting the data object.

The method continues at step 234 where the processing module generates a set of dispersed storage network (DSN) addresses based on the data object identifier, the information regarding the one or more common data object aspects, and the portions number of a first record of the set of records. The generating a DSN address of the set of DSN addresses includes generating a slice index field based on the dispersed storage error encoding function, generating a data object aspect field based on the selected common data object aspects, generating a data object ID based on the data object identifier, and generating a segment field based on the portions number. The method continues at step 236 where the processing module retrieves at least a decode threshold number of encoded data slices from the DSN based on the set of DSN addresses. The method continues at step 238 where the processing module decodes the least a decode threshold number of encoded data slices in accordance with a dispersed storage error encoding function to reproduce at least a portion of a first data object.

The processing module may function to retrieve all portions of the first data object. When retrieving all portions, the method continues at step 240 where the processing module generates a plurality of sets of DSN addresses based on the data object identifier, the information regarding the one or more common data object aspects, and the portions number (e.g., for all data segments). The method continues at step 242 where the processing module retrieves at least a decode threshold number of encoded data slices from the DSN for each of the plurality of sets of DSN addresses. The method continues at step 244 where the processing module decodes the at least a decode threshold number of encoded data slices from the DSN for each of the plurality of sets of DSN addresses in accordance with the dispersed storage error encoding function to reproduce a plurality of portions of the first data object. The method continues at step 246 where the processing module reproduces the first data object from the plurality of portions of the first data object.

The processing module may function to retrieve a portion of more than one data object. When retrieving the portion of more than one data object, the method continues at step 248 where the processing module generates a second set of DSN addresses based on the data object identifier (e.g., incrementing a previous data object identifier by one), the information regarding the one or more common data object aspects, and the portions number of a second record of the set of records. The method continues at step 250 where the processing module retrieves at least a decode threshold number of second encoded data slices from the DSN based on the second set of DSN addresses. The method continues at step 252 where the processing module decodes the least a decode threshold number of second encoded data slices in accordance with the dispersed storage error encoding function to reproduce at least a portion of a second data object.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for storing large amounts of data, the method comprises:
obtaining, by a processing module of a computing device, a plurality of data objects for storage in a dispersed storage network (DSN);
determining, by the processing module, that two data objects of the plurality of data objects have one or more common data object aspects wherein each of the two data objects includes a plurality of data segments;

disperse storage error encoding, by the processing module, the plurality of data segments of a first data object of the two data objects to produce a first plurality of sets of encoded data slices, wherein a data segment of the plurality of data segments is dispersed storage error encoded into a set of encoded data slices of the plurality of sets of encoded data slices and wherein a decode threshold number of encoded data slices of the set of encoded data slices in needed to recover the data segment;

generating, by the processing module, a first plurality of sets of DSN addresses for the first plurality of sets of encoded data slices, wherein DSN addresses of the first plurality of sets of DSN addresses includes a field referencing the one or more common data object aspects;

disperse storage error encoding, by the processing module, the plurality of data segments of a second data object of the two data objects to produce a second plurality of sets of encoded data slices;

generating, by the processing module, a second plurality of sets of DSN addresses for the second plurality of sets of encoded data slices, wherein DSN addresses of the second plurality of sets of DSN addresses includes the field referencing the one or more common data object aspects; and outputting the first and second plurality of sets of encoded data slices for storage in the DSN based on the first and second plurality of sets of DSN addresses.

2. The method of claim 1 further comprises:

creating a record for the first data object in a common data object aspect database, wherein the record includes a data object identifier, information regarding the one or more common data object aspects, and a portions number indicating a number of portions constituting the first data object, wherein the common data object aspect database includes a plurality of records for at least some of the plurality of data objects.

3. The method of claim 1 further comprises:

the one or more common data object aspects is one of a plurality of common data object aspects that includes two or more of: a time window aspect, a destination identifier (ID) of the data object, a source ID of the data object, one or more internet protocol (IP) addresses associated with the data object, a geographic location regarding the data object, data content information of the data object, data size of the data object, a data object type, a capturing unit ID that obtained the data object, and a vault ID.

4. The method of claim 1, wherein generating a DSN address of the first plurality of sets of DSN addresses comprises:

generating a slice index field;
generating a data object aspect field;
generating a data object ID; and
generating a segment field regarding the at least a portion of the first data object.

5. The method of claim 1 further comprises:

decoding a decode threshold number of the first and second plurality of sets of encoded data slices for each data segment of the first and second data objects to produce a reconstructed data object;

analyzing the reconstructed data object to identify additional common data object aspects of the reconstructed data object with a third data object of the plurality of data objects;

disperse storage error encoding at least a portion of the reconstructed data object to produce a new set of encoded data slices;

generating a new set of DSN addresses for the new set of encoded data slices, wherein each of the new set of DSN addresses includes a field referencing the one or more common data object aspects and the additional common data object aspects; and outputting the new set of encoded data slices for storage in the DSN based on the new set of DSN addresses.

6. The method of claim 1 further comprises:

dividing the first data object into a plurality of portions;

disperse storage error encoding the plurality of portions to produce another plurality of sets of encoded data slices;

generating another plurality of sets of DSN addresses for the other plurality of sets of encoded data slices, wherein DSN addresses of the other plurality of sets of DSN addresses includes a field referencing the one or more common data object aspects; and outputting the other plurality of sets of encoded data slices for storage in the DSN based on the other plurality of sets of DSN addresses.

7. A method for retrieving data objects having a common aspect, the method comprises:

selecting, by a processing module of a computing device, one or more common data object aspects from a plurality of common data object aspects to produce selected common data object aspects;

accessing, by the processing module, a common data object aspect database based on the selected common data object aspects to identify a set of records, wherein a record of the common data object aspect database includes a data object identifier of a data object, information regarding one or more common data object aspects of the data object, and a portions number indicating a number of portions constituting the data object;

generating, by the processing module, a first plurality of sets of dispersed storage network (DSN) addresses based on a first data object identifier, the information regarding the one or more common data object aspects, and the portions number of a first record of the set of records;

retrieving, by the processing module, at least a decode threshold number of encoded data slices of a first plurality of sets of encoded data slices from the DSN based on the first plurality of sets of DSN addresses;

decoding, by the processing module, the at least a decode threshold number of encoded data slices of the first plurality of sets of encoded data slices in accordance with a dispersed storage error encoding function to reproduce a plurality of portions of a first data object;

generating, by the processing module, a second plurality of sets of dispersed storage network (DSN) addresses based on a second data object identifier, the information regarding the one or more common data object aspects, and the portions number of a second record of the set of records;

retrieving, by the processing module, at least a decode threshold number of encoded data slices of a second plurality of sets of encoded data slices from the DSN based on the second plurality of sets of DSN addresses; and decoding, by the processing module, the at least a decode threshold number of encoded data slices of the second plurality of sets of encoded data slices in accordance with a dispersed storage error encoding function to reproduce a plurality of portions of a second data object.

8. The method of claim 7, wherein the plurality of common data object aspects comprises two or more of:
a time window aspect, a destination identifier (ID) of the data object, a source ID of the data object, one or more internet protocol (IP) addresses associated with the data object, a geographic location regarding the data object, data content information of the data object, data size of the data object, a data object type, a capturing unit ID that obtained the data object, and a vault ID.

9. The method of claim 7, wherein generating a DSN address of the first and second plurality of sets of DSN addresses comprises:
generating a slice index field based on the dispersed storage error encoding function;
generating a data object aspect field based on the selected common data object aspects;
generating a data object ID based on the data object identifier; and
generating a segment field based on the portions number.

10. A capturing unit comprises:
a first module, when operable within a computing device, causes the computing device to obtain a plurality of data objects for storage in a dispersed storage network (DSN);
a second module, when operable within the computing device, causes the computing device to determine that two data objects of the plurality of data objects have one or more common data object aspects wherein each of the two data objects includes a plurality of data segments;
a third module, when operable within the computing device, causes the computing device to:
disperse storage error encode the plurality of data segments of a first data object of the two data objects to produce a first plurality of sets of encoded data slices, wherein a data segment of the plurality of data segments is dispersed storage error encoded into a set of encoded data slices of the first plurality of sets of encoded data slices and wherein a decode threshold number of encoded data slices of the set of encoded data slices in needed to recover the data segment; and
disperse storage error encode the plurality of data segments of a second data object of the two data objects to produce a second plurality of sets of encoded data slices;
a fourth module, when operable within the computing device, causes the computing device to:
generate a first plurality of sets of DSN addresses for the first plurality of sets of encoded data slices, wherein DSN addresses of the first plurality of sets of DSN addresses includes a field referencing the one or more common data object aspects; and
generate a second plurality of sets of DSN addresses for the second plurality of sets of encoded data slices, wherein DSN addresses of the second plurality of sets of DSN addresses includes the field referencing the one or more common data object aspects; and
a fifth module, when operable within the computing device, causes the computing device to output the first and second plurality of sets of encoded data slices for storage in the DSN based on the first and second plurality of sets of DSN addresses.

11. The capturing unit of claim 10 further comprises:
a sixth module, when operable within the computing device, causes the computing device to create a record for the first data object in a common data object aspect database, wherein the record includes a data object identifier, information regarding the one or more common data object aspects, and a portions number indicating a number of portions constituting the first data object, wherein the common data object aspect database includes a plurality of records for at least some of the plurality of data objects.

12. The capturing unit of claim 10 further comprises:
the one or more common data object aspects is one of a plurality of common data object aspects that includes two or more of: a time window aspect, a destination identifier (ID) of the data object, a source ID of the data object, one or more internet protocol (IP) addresses associated with the data object, a geographic location regarding the data object, data content information of the data object, data size of the data object, a data object type, a capturing unit ID that obtained the data object, and a vault ID.

13. The capturing unit of claim 10, wherein the fourth module, when operable, generates a DSN address of the first plurality of sets of DSN addresses by:
generating a slice index field;
generating a data object aspect field;
generating a data object ID; and
generating a segment field regarding the at least a portion of the first data object.

14. The capturing unit of claim 10 further comprises:
a sixth module, when operable within the computing device, causes the computing device to decode a decode threshold number of the first and second plurality of sets of encoded data slices for each portion of the first and second data objects to produce a reconstructed data object;
the second module is further operable to analyze the reconstructed data object to identify additional common data object aspects of the reconstructed data object with a third data object of the plurality of data objects;
the third module is further operable to disperse storage error encode at least a portion of the reconstructed data object to produce a new set of encoded data slices;
the fourth module is further operable to generate a new set of DSN addresses for the new set of encoded data slices, wherein each of the new set of DSN addresses includes a field referencing the one or more common data object aspects and the additional common data object aspects; and
the fifth module is further operable to output the new set of encoded data slices for storage in the DSN based on the new set of DSN addresses.

15. The capturing unit of claim 10 further comprises:
the third module is further operable to:
divide the first data object into a plurality of portions; and
disperse storage error encode the plurality of portions to produce another plurality of sets of encoded data slices;
the fourth module is further operable to generate another plurality of sets of DSN addresses for the other plurality of sets of encoded data slices, wherein DSN addresses of the other plurality of sets of DSN addresses includes a field referencing the one or more common data object aspects; and
the fifth module is further operable to output the other plurality of sets of encoded data slices for storage in the DSN based on the other plurality of sets of DSN addresses.

16. A retrieving unit comprises:
a first module, when operable within a computing device, causes the computing device to select one or more common data object aspects from a plurality of common data object aspects to produce selected common data object aspects;

a second module, when operable within the computing device, causes the computing device to access a common data object aspect database based on the selected common data object aspects to identify a set of records, wherein a record of the common data object aspect database includes a data object identifier of a data object, information regarding one or more common data object aspects of the data object, and a portions number indicating a number of portions constituting the data object;

a third module, when operable within the computing device, causes the computing device to:
  generate a first plurality of sets of dispersed storage network (DSN) addresses based on a first data object identifier, the information regarding the one or more common data object aspects, and the portions number of a first record of the set of records; and
  generate a second plurality of sets of dispersed storage network (DSN) addresses based on a second data object identifier, the information regarding the one or more common data object aspects, and the portions number of a second record of the set of records;

a fourth module, when operable within the computing device, causes the computing device to:
  retrieve at least a decode threshold number of encoded data slices of a first plurality of sets of encoded data slices from the DSN based on the first plurality of sets of DSN addresses; and
  retrieve at least a decode threshold number of encoded data slices of a second plurality of sets of encoded data slices from the DSN based on the second plurality of sets of DSN addresses;

a fifth module, when operable within the computing device, causes the computing device to:
  decode the at least a decode threshold number of encoded data slices of the first plurality of sets of encoded data slices in accordance with a dispersed storage error encoding function to reproduce a plurality of portions of a first data object; and
  decode the at least a decode threshold number of encoded data slices of the second plurality of sets of encoded data slices in accordance with a dispersed storage error encoding function to reproduce a plurality of portions of a second data object.

17. The retrieving unit of claim 16, wherein the plurality of common data object aspects comprises two or more of:
  a time window aspect, a destination identifier (ID) of the data object, a source ID of the data object, one or more internet protocol (IP) addresses associated with the data object, a geographic location regarding the data object, data content information of the data object, data size of the data object, a data object type, a capturing unit ID that obtained the data object, and a vault ID.

18. The retrieving unit of claim 16, wherein the third module is further operable to generate a DSN address of the first and second plurality of sets of DSN addresses by:
  generating a slice index field based on the dispersed storage error encoding function;
  generating a data object aspect field based on the selected common data object aspects;
  generating a data object ID based on the data object identifier; and
  generating a segment field based on the portions number.

* * * * *